United States Patent [19]

Beale et al.

[11] Patent Number: 4,623,808

[45] Date of Patent: Nov. 18, 1986

[54] ELECTROMECHANICAL TRANSDUCER PARTICULARLY SUITABLE FOR A LINEAR ALTERNATOR DRIVEN BY A FREE-PISTON STIRLING ENGINE

[75] Inventors: William T. Beale; Christopher G. Scheck, both of Athens, Ohio

[73] Assignee: Sunpower, Inc., Athens, Ohio

[21] Appl. No.: 720,005

[22] Filed: Apr. 4, 1985

Related U.S. Application Data

[63] Continuation of Ser. No. 556,792, Dec. 1, 1983, abandoned.

[51] Int. Cl.[4] .................................................. H02K 33/00
[52] U.S. Cl. ........................................ 310/15; 310/12; 310/30
[58] Field of Search .................................. 310/12–15, 310/30, 266, 168; 290/1 R

[56] References Cited

U.S. PATENT DOCUMENTS

| | | | |
|---|---|---|---|
| 3,470,408 | 9/1969 | Lewis et al. | 310/266 X |
| 4,346,318 | 8/1982 | Shtrikman | 310/12 |
| 4,349,757 | 9/1982 | Bhate | 310/30 X |
| 4,454,426 | 6/1984 | Benson | 310/15 X |

*Primary Examiner*—Donovan F. Duggan
*Attorney, Agent, or Firm*—Frank H. Foster

[57] ABSTRACT

An electromechanical transducer particularly useful as a linear alternator driven by a free-piston Stirling engine is disclosed. A relatively high permeability material is formed into a flux loop having at least two pairs of spaced gaps formed transversely through the loop. Each pair of gaps is aligned along a reciprocation path for a magnet which is mechanically mounted for reciprocation between alternate positions within the gaps of each pair. The magnets have a magnetization vector transverse to the reciprocation path and are drivingly linked to a mechanical energy input or output for operation respectively as an alternator or motor. The armature coil is wound around a portion of the flux loop.

6 Claims, 6 Drawing Figures

ELECTROMECHANICAL TRANSDUCER PARTICULARLY SUITABLE FOR A LINEAR ALTERNATOR DRIVEN BY A FREE-PISTON STIRLING ENGINE

This is a continuation of application Ser. No. 556,792 filed Dec. 1, 1983, now abandoned.

FIELD OF THE INVENTION

This invention relates generally to electromechanical transducers of the electromagnetic type used as electric motors and generators and more particularly relates to a transducer which has a relatively small reciprocating mass and which is particularly advantageous for use in a linearly reciprocating alternator.

BACKGROUND OF THE INVENTION

All electromagnetic types of electromechanical transducers for converting energy between a mechanical form and an electrical form operate on the same basic principles utilizing a time change of magnetic flux through a coil of wire. The differences between them lie in their practicality and relative efficiency.

In order to optimize efficiency and practicality, a variety of different parameters must be considered and optimized. For example, in a linearly reciprocating machine, such as a linear alternator, it is desirable to minimize the mass which must be driven in reciprocation in order to minimize the momentum which must be overcome by the driving forces. Similarly, it is desirable to minimize the total mass of an electrical alternator in order to provide the maximum ratio of energy output to alternator weight.

Another goal in the design of such electromagnetic, electromechanical transducers is to maximize the electric current at which the machine can operate before the transformer iron, which is used to provide a high permeance flux path, begins to saturate. The flux causing saturation arises from two components, one from the source of magnetic flux, such as a permanent magnet and the other from the current induced in the armature winding. The latter source, referred to as the armature reaction flux, is proportional to the armature current divided by air gap distance. Thus, reducing the armature reaction flux by increasing the number of working gaps permits a higher operating current before saturation.

Another goal in the design of a linear alternator is that it permits the armature windings to be easily and conveniently wound without winding through a narrow gap or forming the core in separable parts which are connected after the coil is wound to form an unwanted gap at the junction.

BRIEF SUMMARY OF THE INVENTION

In the copending and concurrently filed patent application of Robert Redlich, an electromechanical transducer is disclosed having a flux loop formed of a relatively high permeance material with at least a pair of spaced gaps formed transversely through the loop and aligned along a reciprocation path. A coil is wound around the loop to provide for magnetic coupling with the flux loop and electrical connection to the external circuitry. A magnet is mechanically mounted for reciprocation along the reciprocation path to alternate positions within the two gaps. The magnet has a magnetization vector which is transverse and preferably perpendicular to the reciprocation path and across the gap. The magnet is drivingly linked to a mechanical energy input or output for operation as an alternator or motor respectively.

Like the Redlich device the present invention differs from prior art devices in a variety of ways most notably including: the magnets go into the gaps rather than across a gap; and the magnet is magnetized across the gap preferably perpendicularly to its reciprocation path. Unlike the Redlich device the present invention has at least four gaps per flux loop.

Because the armature reaction flux passes through two gaps for each magnet instead of one, the armature reaction flux is reduced thus permitting higher operating currents. Further, electromechanical transducers in accordance with the present invention exhibit a power to weight ratio which is an improvement over the prior art by a factor of at least two and an improvement over Redlich by approximately 1.33. This, results in part, as in Redlich, because the total mass is less and more particularly because the mass which must reciprocate consists solely of the magnets themselves. None of the high permeance flux path is reciprocated. Embodiments of the present invention operate at considerably lower magnetic flux. They use their copper windings more efficiently because the magnet does not move into space which is available for the copper windings. Embodiments of the present invention are mechanically configured to permit winding directly on the core material without the requirement for a two piece core.

Figure 1:
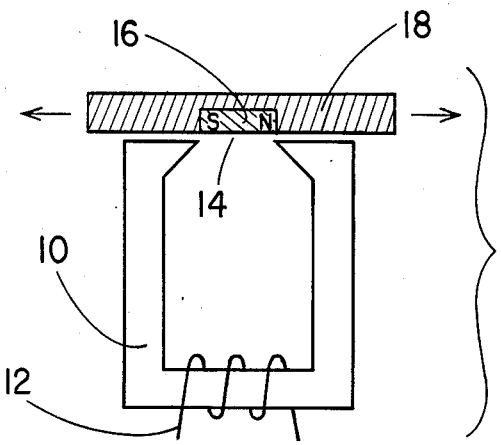
FIG. 1 is a simplified schematic diagram illustrating the principles of some prior art electromechanical transducers.

In describing the preferred embodiment of the invention which is illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose. For example, the word connected or terms similar thereto are often used. They are not limited to direct connection but include connection through other circuit elements where such connection is recognized as being equivalent by those skilled in the art.

DETAILED DESCRIPTION

FIG. 1 illustrates the principles of operation of devices which are numerous in the prior art. Such a device has a flux loop 10 formed by a relatively high permeance or high permeability material around which an armature coil 12 is wound. A gap 14 is provided in the path. A magnet 16 is embedded in a high permeability material 18 and is polarized in the direction of its reciprocation. The device of FIG. 1 induces a time changing flux in the flux loop 10 as the magnet 16 crosses the gap 14. When the magnet 16 is positioned directly opposite a pole piece essentially no magnetic flux is set up in the flux path 10. The result is that during much of the cycle time there is not much flux change except as the magnet crosses the gap. Therefore that structure tends to generate voltage spikes of relatively short duration.

U.S. Pat. No. 4,346,318 illustrates an electric motor which is somewhat different. It has a pair of oppositely polarized, adjacently mounted magnets which are reciprocated within a single gap.

Figure 2:
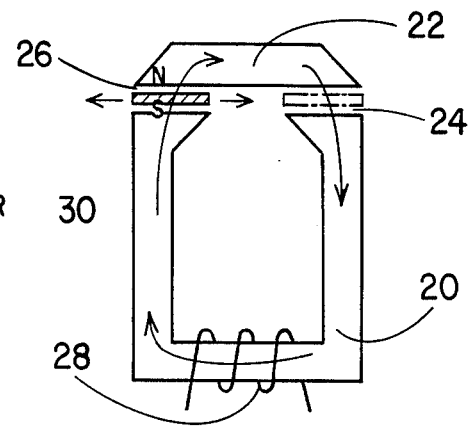
FIG. 2 is a schematic diagram illustrating in its most simplified form the basic principles of operation of an embodiment of the Redlich invention.

FIG. 2 represents the Redlich invention in its most simplified form. In the embodiment of FIG. 2 a flux loop is formed of a high permeability material in two segments, a principle segment 20 and a relatively minor segment 22. The two segments are separate because in embodiments of the present invention there are at least two spaced gaps formed transversely through the flux loop. These two gaps 24 and 26 must also be aligned along a reciprocation path. An armature coil 28 is wound around the loop.

A magnet 30, which is a permanent magnet or other source of magnetic flux, is mechanically mounted for reciprocation along the reciprocation path to alternate positions within the gaps 24 and 26. The magnet 30 has a magnetization vector transverse to and preferably perpendicular to the reciprocation path so that it is magnetized across the gap. Thus, the magnet 30 sets up a flux in the flux loop when it is directly opposite a pole piece. The flux set up in the flux path is in one direction, as illustrated in FIG. 2 when it is in the gap 26, and will be in the opposite direction when the magnet is moved to the gap 24.

The magnet is preferably a permanent magnet i.e., it exhibits a high residual flux and a high coercive force. Preferably it is a rare earth cobalt permanent magnet most preferably samarium cobalt. The flux loop is formed of a high permeability or permeance material such as conventional transformer iron.

Thus, in the operation of the embodiment of FIG. 2 an alternating electromotive force or e.m.f. is induced in the coil 28 by reciprocating essentially only the magnet 30 between alternate positions within gaps 24 and 26 while maintaining the magnetization vector of the magnet 30 transverse to the path of reciprocation. The reciprocating mass is substantially devoid of any attached ferromagnetic flux path and therefore excess mass, such as iron, is not required to be driven in reciprocation.

Figure 4:
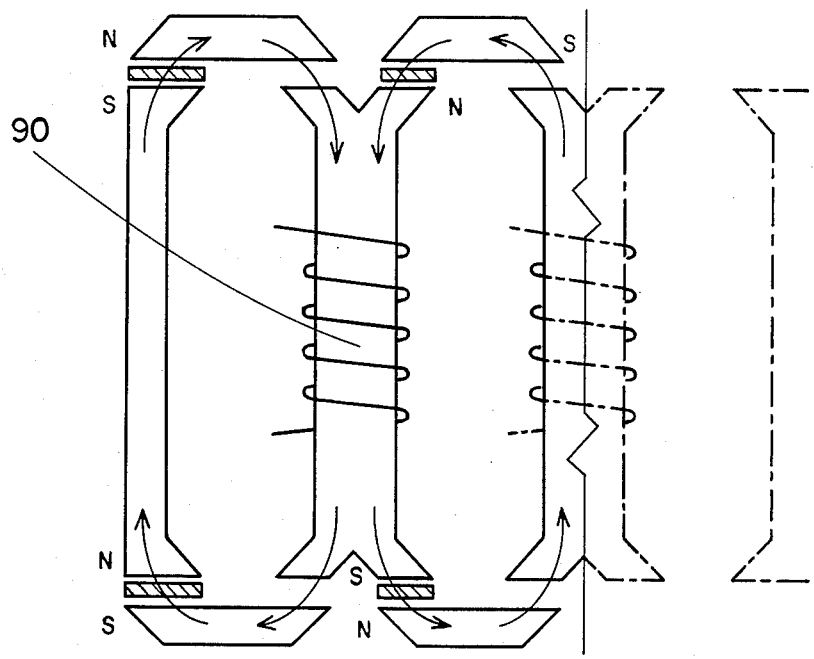
FIG. 4 is a schematic diagram of a cascaded embodiment of the invention.

FIG. 4 illustrates a basic form of the invention illustrating the principles of the invention. In the embodiment of FIG. 4 a single flux loop consists of the major, intermediate legs 80 and 82 and minor outer legs 84 and 86. This one flux loop has a total of four gaps 87A through 87D and a single armature winding 88.

Figure 3:
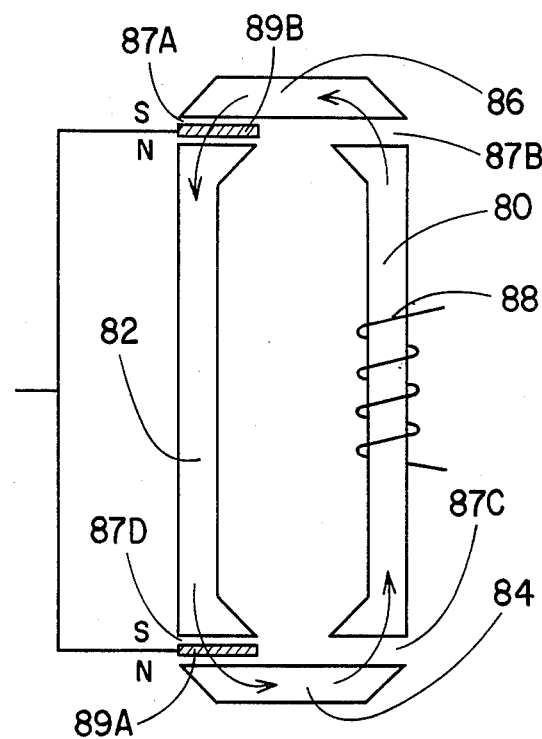
FIG. 3 is a schematic diagram of a simplified alternative embodiment of the present invention.

The magnets 89A and 89B of FIG. 3, preferably reciprocate along parallel linear paths. These paths may be formed in a pair of parallel planes perpendicular to the drawing of FIG. 3 with the major legs 80 and 82 extending between those planes. Alternatively, the gaps and the magnets may be formed in the shape of opposite arcuate segments of a cylinder. However, because of the position of the armature winding 88, the major legs 80 and 82 cannot be revolved to generate a unit which is symmetrical about a central axis in all directions.

Flux loops of the present invention may also be formed in a cascaded series of adjoining loops such as illustrated in FIG. 4. FIG. 4 is merely a cascaded series of repetitions of the type of embodiment illustrated in FIG. 3. It is constructed of adjacent flux loops each loop having four gaps and two magnets. Adjoining loops share an intermediate leg, such as leg 90, about which the armature winding coil 92 is wound.

As illustrated in phantom in FIG. 4, numerous additional loops may be cascaded with the gaps aligned preferably along parallel reciprocation paths. The magnets may be mechanically joined to each other and to a mechanical energy input or output as mentioned above.

Figure 5:
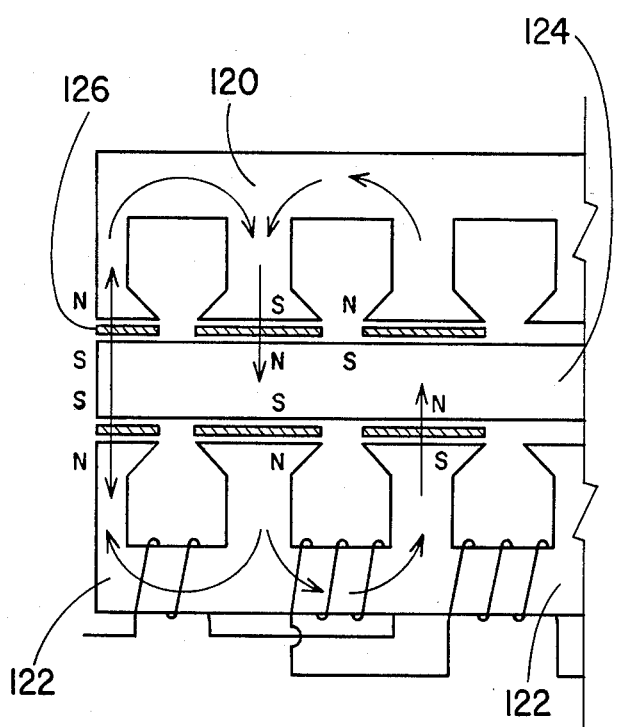
FIG. 5 is an alternative embodiment of the invention in which the reciprocating magnets reciprocate in a path which is inward of the armature coil rather than outward as illustrated in the embodiments of FIGS. 2–4.

The embodiment of FIGS. 3 and 4 illustrate the reciprocating magnets positioned outwardly of the major flux path and the armature coils. However, the relative positions may be reversed so that the armature coils are outwardly of the reciprocating magnets. This analogous situation is illustrated in FIG. 5. FIG. 5 illustrates a plurality of oppositely extending, U-shaped portions forming the major flux loops 120 and 122 with an intermediate minor flux loop segment 124 and reciprocating magnets, such as magnet 126. Each loop shares a leg in common with its neighbor loop.

Figure 6:
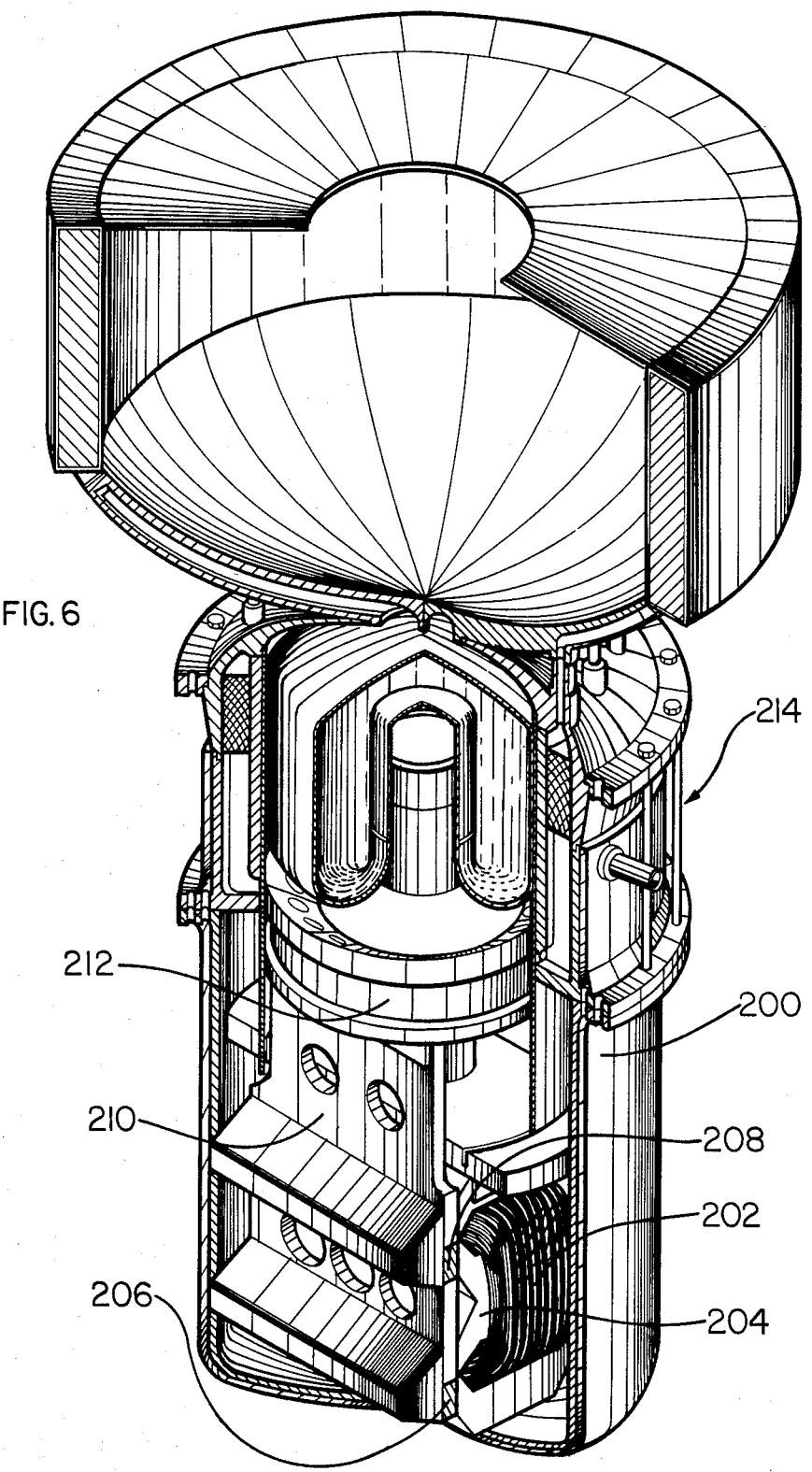
FIG. 6 is a view in perspective, with a section removed, to illustrate the preferred embodiment of the invention.

FIG. 6 illustrates the preferred embodiment of the invention of the type also illustrated in FIG. 4. It has a armature winding 202 wound upon the major leg 204. The magnets 206 and 208 are mechanically mounted in a non-ferromagnetic, lightweight support plate 210. The support plate 210 is mechanically connected to the power piston 212 of a free piston Stirling engine 214.

It is to be understood that while the detailed drawings and specific examples given describe preferred embodiments of the invention, they are for the purposes of illustration only, that the apparatus of the invention is not limited to the precise details and conditions disclosed and that various changes may be made therein without departing from the spirit of the invention which is defined by the following claims:

We claim:

1. An electromechanical transducer comprising:
   (a) a flux loop member which is stationary relative to the below described magnets, said member formed of a relatively high permeability material the flux loop member having at least two pairs of spaced gaps formed transversely through said loop member to provide at least two pairs of gaps in each flux loop, each pair of gaps aligned along a reciprocation path;
   (b) an armature coil wound about said loop member; and
   (c) at least two magnets each mechanically mounted for reciprocation along the reciprocation path for a different one of said pairs of gaps to alternate positions within the gaps of each pair, said magnets having a magnetization vector transverse to their reciprocation paths and across said gap and drivingly linked to a mechanical energy input or output.

2. An electromechanical transducer in accordance with claim 1 wherein each pair of gaps is formed along parallel, linear reciprocation paths.

3. An electromechanical transducer in accordance with claim 2 wherein there are a plurality of said flux loops formed in a cascaded series of adjourning loops having their gaps aligned along parallel reciprocation paths, each loop sharing a common leg with its adjacent neighbor loop.

4. An electromechaical transducer in accordance with claim 2 wherein said parallel reciprocation paths are positioned in spaced parallel planes.

5. An electromechanical transducer in accordance with claim 2 wherein said armature coil is interposed between said reciprocation paths.

6. An electromechanical transducer in accordance with claim 2 wherein said armature coil is outside of said reciprocation paths.

* * * * *